(12) United States Patent
Rassi et al.

(10) Patent No.: US 10,486,354 B2
(45) Date of Patent: Nov. 26, 2019

(54) EXTRUDED BOARD WITH REALISTIC APPEARANCE

(71) Applicant: Poly-Wood, LLC, Syracuse, IN (US)

(72) Inventors: Douglas Rassi, Milford, IN (US);
Jason Carrington, Goshen, IN (US);
Kevin Nobes, Goshen, IN (US)

(73) Assignee: Poly-Wood, LLC, Syracuse, IN (US)

( * ) Notice: Subject to any disclaimer, the term of this patent is extended or adjusted under 35 U.S.C. 154(b) by 346 days.

(21) Appl. No.: 15/389,600

(22) Filed: Dec. 23, 2016

(65) Prior Publication Data

US 2017/0100870 A1 Apr. 13, 2017

Related U.S. Application Data

(63) Continuation-in-part of application No. 14/573,404, filed on Dec. 17, 2014, now Pat. No. 9,527,341.

(51) Int. Cl.
*B29C 44/00* (2006.01)
*B29C 44/50* (2006.01)
(Continued)

(52) U.S. Cl.
CPC ............. *B29C 48/30* (2019.02); *B29C 44/20* (2013.01); *B29C 44/5627* (2013.01); *B29C 44/5645* (2013.01); *B29C 44/5654* (2013.01); *B29C 48/002* (2019.02); *B29C 48/07* (2019.02); *B29C 48/345* (2019.02); *B29C 48/362* (2019.02); *B29C 48/6803* (2019.02); *B29C 48/695* (2019.02); *B29C 48/70* (2019.02); *B29C 48/705* (2019.02); *B29C 48/832* (2019.02); *B44C 1/24* (2013.01); *B44C 5/06* (2013.01);
(Continued)

(58) Field of Classification Search
CPC ............ B29C 44/5627; B29C 44/5654; B29C 44/5645; B29C 59/02; B29C 2059/027; B29C 59/021; B29C 48/695; B29C 48/70; B29C 48/705; B29C 48/71; B29C 44/005; B29C 44/20; B29C 44/22; B29C 44/505; B29C 44/50; B29C 44/507; B29C 44/56
See application file for complete search history.

(56) References Cited

U.S. PATENT DOCUMENTS 3,624,192 A * 11/1971 McCoy ................. B29C 44/468
264/237
3,713,762 A * 1/1973 Oisugu ................. B29C 44/468
264/45.9
(Continued)

OTHER PUBLICATIONS

International Search Report corresponding to international application No. PCT/US2015/62981, dated Mar. 28, 2016 (5 pages).

*Primary Examiner* — Jeffrey M Wollschlager
(74) *Attorney, Agent, or Firm* — Maginot, Moore & Beck, LLP

(57) ABSTRACT

In one embodiment, a method of forming an extruded board includes mixing a resin and a foaming agent, melting the mixed resin and foaming agent to form a uniformly colored extrudate, differentially expanding voids formed from the foaming agent within the uniformly colored extrudate by passing the uniformly colored extrudate through a breaker plate, forming a board with the differentially expanded voids and uniformly colored extrudate, and forming lightened portions on an outermost surface of the formed board.

14 Claims, 12 Drawing Sheets
(5 of 12 Drawing Sheet(s) Filed in Color)

(51) Int. Cl.
| | | |
|---|---|---|
| B29C 44/22 | (2006.01) | |
| B29L 31/00 | (2006.01) | |
| B29K 105/00 | (2006.01) | |
| B29C 41/22 | (2006.01) | |
| C04B 111/54 | (2006.01) | |
| B29C 48/17 | (2019.01) | |
| B29C 48/19 | (2019.01) | |
| B29C 48/20 | (2019.01) | |
| B29C 48/30 | (2019.01) | |
| B29C 44/20 | (2006.01) | |
| B29C 48/345 | (2019.01) | |
| B29C 48/00 | (2019.01) | |
| B29C 48/07 | (2019.01) | |
| B29C 44/56 | (2006.01) | |
| B29C 48/695 | (2019.01) | |
| B29C 48/70 | (2019.01) | |
| B44C 1/24 | (2006.01) | |
| B44C 5/06 | (2006.01) | |
| B44F 9/02 | (2006.01) | |
| B29C 48/68 | (2019.01) | |
| B29C 48/36 | (2019.01) | |
| B29C 48/80 | (2019.01) | |
| B29K 25/00 | (2006.01) | |
| B29K 105/04 | (2006.01) | |
| B29K 105/26 | (2006.01) | |
| B29C 59/02 | (2006.01) | |
| B29C 48/71 | (2019.01) | |

(52) U.S. Cl.
CPC ............. B44F 9/02 (2013.01); *B29C 41/22* (2013.01); *B29C 44/005* (2013.01); *B29C 44/22* (2013.01); *B29C 44/50* (2013.01); *B29C 44/505* (2016.11); *B29C 44/507* (2016.11); *B29C 44/56* (2013.01); *B29C 48/17* (2019.02); *B29C 48/175* (2019.02); *B29C 48/19* (2019.02); *B29C 48/20* (2019.02); *B29C 48/71* (2019.02); *B29C 59/02* (2013.01); *B29C 59/021* (2013.01); *B29C 2059/027* (2013.01); *B29K 2025/06* (2013.01); *B29K 2105/0032* (2013.01); *B29K 2105/04* (2013.01); *B29K 2105/26* (2013.01); *B29K 2995/002* (2013.01); *B29K 2995/0021* (2013.01); *B29L 2031/722* (2013.01); *B29L 2031/7222* (2013.01); *C04B 2111/542* (2013.01); *C04B 2111/545* (2013.01); *Y10T 428/24438* (2015.01); *Y10T 428/24901* (2015.01)

(56) References Cited

U.S. PATENT DOCUMENTS

| | | | | |
|---|---|---|---|---|
| 3,720,572 A * | 3/1973 | Soda | ............... | B29C 44/468 156/167 |
| 3,863,001 A * | 1/1975 | Thumudo, Jr. | ........ | B29B 11/10 264/148 |
| 3,867,493 A * | 2/1975 | Seki | ............... | B29C 44/468 264/177.17 |
| 3,993,721 A * | 11/1976 | Soda | ............... | B29C 44/22 264/45.5 |
| 4,071,591 A * | 1/1978 | Kobayashi | ......... | B29C 48/0012 264/45.3 |
| 4,075,265 A * | 2/1978 | McClung | ............... | B29C 44/50 264/177.1 |
| 4,610,900 A | 9/1986 | Nishibori | | |
| 4,824,720 A * | 4/1989 | Malone | ............... | B29C 44/468 264/45.1 |
| 4,863,791 A * | 9/1989 | Steward | ............... | B29C 44/22 428/310.5 |
| 4,960,549 A * | 10/1990 | Brooks | ............... | B29C 44/60 264/148 |
| 5,271,699 A * | 12/1993 | Barre | ............... | B27M 1/006 144/2.1 |
| 5,516,472 A | 5/1996 | Laver | | |
| 5,538,777 A * | 7/1996 | Pauley | ............... | B29C 44/22 428/122 |
| 5,700,555 A | 12/1997 | Grill | | |
| 5,869,138 A * | 2/1999 | Nishibori | ............... | B27N 3/007 427/274 |
| 5,998,006 A * | 12/1999 | Bambara | ............... | B29C 48/175 428/304.4 |
| 6,153,293 A | 11/2000 | Dahl et al. | | |
| 6,692,815 B2 | 2/2004 | Edgman | | |
| 6,844,055 B1 * | 1/2005 | Grinshpun | ............... | B29C 44/04 428/304.4 |
| 7,507,464 B2 | 3/2009 | Walrath | | |
| 7,763,345 B2 | 7/2010 | Chen et al. | | |
| 8,210,616 B2 | 7/2012 | Schwartz | | |
| 9,605,546 B1 * | 3/2017 | Lowe | ............... | F04D 29/023 |
| 2002/0107326 A1 | 8/2002 | Hendess | | |
| 2004/0217503 A1 * | 11/2004 | Grinshpun | ............... | B29C 44/04 264/45.9 |
| 2005/0003221 A1 | 1/2005 | Walrath | | |
| 2005/0053767 A1 | 3/2005 | Franco et al. | | |
| 2006/0061004 A1 * | 3/2006 | Bufton | ............... | B29C 48/693 264/75 |
| 2006/0199872 A1 * | 9/2006 | Prieto | ............... | C08J 9/00 521/142 |
| 2006/0205846 A1 | 9/2006 | Spitz et al. | | |
| 2007/0091614 A1 | 4/2007 | Kaisser et al. | | |
| 2008/0095873 A1 * | 4/2008 | Gibbons | ............... | B29C 48/30 425/4 R |
| 2010/0021715 A1 * | 1/2010 | Kondo | ............... | B27N 3/005 428/310.5 |
| 2010/0107530 A1 | 5/2010 | Pietruxzynik et al. | | |
| 2012/0210663 A1 | 8/2012 | May | | |
| 2013/0224437 A1 | 8/2013 | Park et al. | | |
| 2015/0044434 A1 * | 2/2015 | Kotiadis | ............... | B05D 7/02 428/207 |
| 2015/0107032 A1 * | 4/2015 | Regan | ............... | B29D 35/122 12/146 B |
| 2016/0002429 A1 * | 1/2016 | Donea | ............... | B32B 27/065 428/220 |
| 2016/0096940 A1 * | 4/2016 | D'Ottaviano | ....... | B29C 44/5654 428/220 |
| 2017/0282430 A1 * | 10/2017 | Baldwin | ............... | B29C 35/0866 |

* cited by examiner

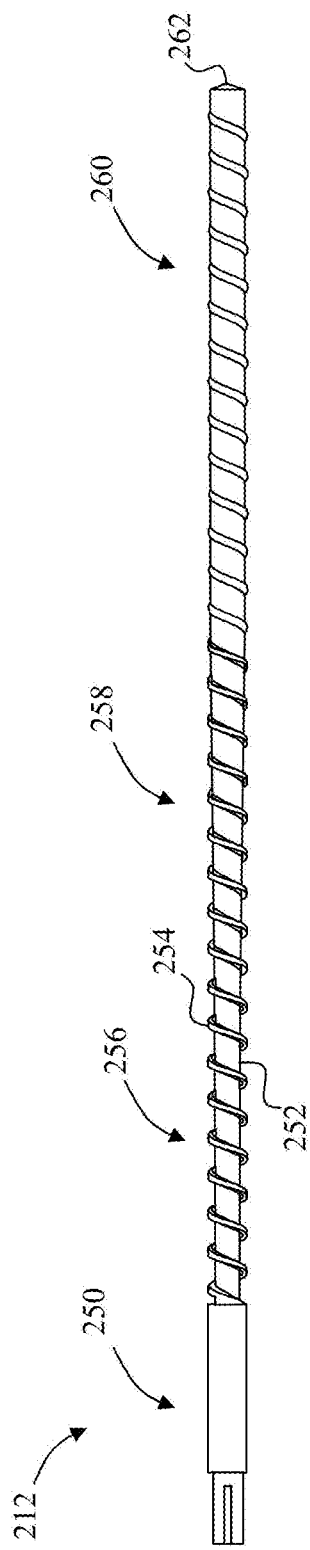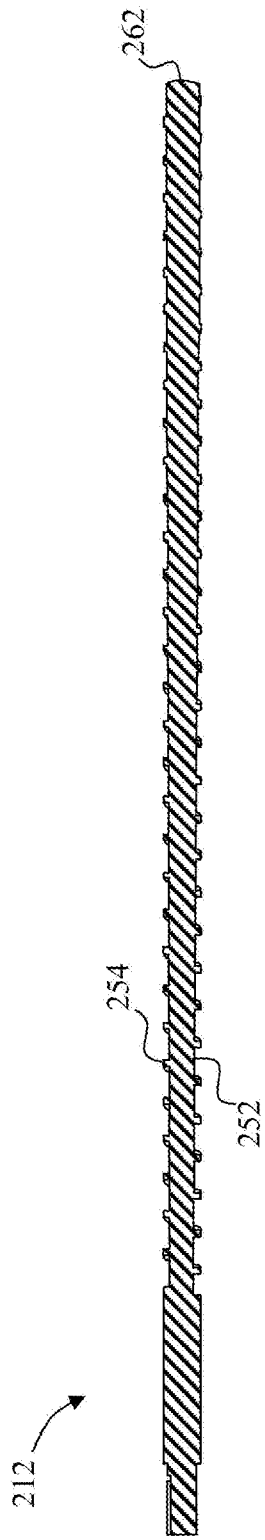
FIG. 5
FIG. 6

EXTRUDED BOARD WITH REALISTIC APPEARANCE

This application is a continuation-in-part of application Ser. No. 14/573,404, filed on Dec. 17, 2014, now U.S. Pat. No. 9,527,341, the disclosure of which is hereby totally incorporated by reference in its entirety.

FIELD

This disclosure relates to extruded plastic articles.

BACKGROUND

Wood is a common and highly valued resource in the manufacture of items including outdoor furniture. Wood is a natural material which is strong and typically quite durable. Nonetheless, wood is a natural product which is susceptible to various pests and decay. Accordingly, wood can deteriorate over time.

A historical benefit of wood is that wood is a renewable resource. As the demand for wood has increased, however, the sourcing of wood has become problematic. Wood boards which are used in the manufacture of items also have a variety of grain patterns which add tremendously to the beauty of the finished products. Different varieties of wood, however, produce different grain patterns, with some of the more desirable grain patterns being found in wood types which are not as readily renewable as other types of wood.

In response to the difficulty in overcoming some of the above described problems, various attempts have been made to replicate the look of wood in non-wood products. In some of these approaches, wood is mixed with a resin in order to extrude an artificial board. A major shortcoming of these approaches is that the resulting product looks more like a plastic board than a wood board.

Other approaches to mimicking the look of real wood is the embossing of boards with a grain-like pattern. While this approach provides, at least to some extent, a grain-like feel to the boards and a superficial three dimensional look to the grain, simply embossing a board fails to achieve a true three dimensional look of wood grain which provides the basic beauty of wood boards.

Some processes have been developed in an attempt to more closely mimic the three dimensional look of wood grain. For example, U.S. Patent Application Publication No. 2010/0107530, published on May 6, 2010, describes a process wherein colored streakers are introduced into a transparent or translucent matrix. The streakers are selected to melt during processing of the extrudate such that they are not mixed with the rest of the extrudate. The result is a "streak" within the transparent or translucent material which provides a depth to the product. Additional "wood-like" characteristics are provided by embossing a grain-like texture into the transparent or translucent. The streaks in these products help provide a three dimensional look of wood grain when viewed from afar. Of course, graining of natural wood is not simply the result of streaks of color in a transparent or translucent matrix. Moreover, the streaking of the '530 publication is located in a layer formed over the core material, adding complexity to manufacturing.

What is needed therefore is a board which presents a realistic look similar to the look of natural wood. A further need exists for realistic board which can be manufactured without excessive modification of known devices. A realistic board which can be easily recycled would be further beneficial.

SUMMARY

In one embodiment, a method of forming an extruded board includes mixing a resin and a foaming agent, melting the mixed resin and foaming agent to form a uniformly colored extrudate, differentially expanding voids formed from the foaming agent within the uniformly colored extrudate by passing the uniformly colored extrudate through a breaker plate, forming a board with the differentially expanded voids and uniformly colored extrudate, and forming lightened portions on an outermost surface of the formed board.

In one or more embodiments, differentially expanding the voids includes forming at least one first longitudinally extending area of first void spaces; and forming at least one second longitudinally extending area of second void spaces, wherein the first void spaces are on average larger than the second void spaces.

In one or more embodiments, at least a portion of the at least one first longitudinally extending area is immediately alongside at least a portion of the at least one second longitudinally extending area.

In one or more embodiments, forming the lightened portions includes removing a portion of an outer surface of the formed board, creating a plurality of open void spaces by removing the portion of the outer surface, and at least partially closing each of the plurality of open void spaces.

In one or more embodiments, forming the lightened portions includes planing the formed board.

In one or more embodiments, forming the lightened portions includes buffing an exposed outer surface of the formed board.

In one or more embodiments, mixing a resin and a foaming agent includes providing waste material, the waste material having a first color, and mixing the waste material with a virgin resin portion, wherein the uniformly colored extrudate has a second color and the second color is the same color as the first color.

In one or more embodiments, differentially expanding voids includes forcing the uniformly colored extrudate through a plurality of concentrically formed orifices.

In one or more embodiments, differentially expanding voids includes forcing the uniformly colored extrudate through a plurality of concentrically formed elongated orifices.

In one or more embodiments, a method of forming an extruded board includes exposing the outermost surface of the formed board by removing an outer surface layer of between about 0.20 inches and 0.060 inches of the formed board.

In one or more embodiments, a method of forming an extruded board includes forming a clear sealer layer on the outermost surface of the formed board.

In one embodiment, an extruded board includes a base material having a uniform color throughout, at least one first longitudinally extending area of first void spaces in the base material at an outermost surface of the base material, and at least one second longitudinally extending area of second void spaces in the base material at the outermost surface of the base material, wherein the first void spaces are on average larger than the second void spaces.

In one or more embodiments, the at least one first longitudinally extending area appears to be visually lighter than the at least one second longitudinally extending area.

In one or more embodiments, at least a portion of the at least one first longitudinally extending area is immediately alongside at least a portion of the at least one second longitudinally extending area.

In one or more embodiments, a plurality of the first void spaces are at least partially closed.

In one or more embodiments, an extruded board includes a clear sealer layer on the outermost surface.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 5 depicts a side plan view of the screw in the extruder of FIG. 4;

FIG. 6 depicts a cross-sectional view of the screw in the extruder of FIG. 4;

DESCRIPTION

Figure 1:
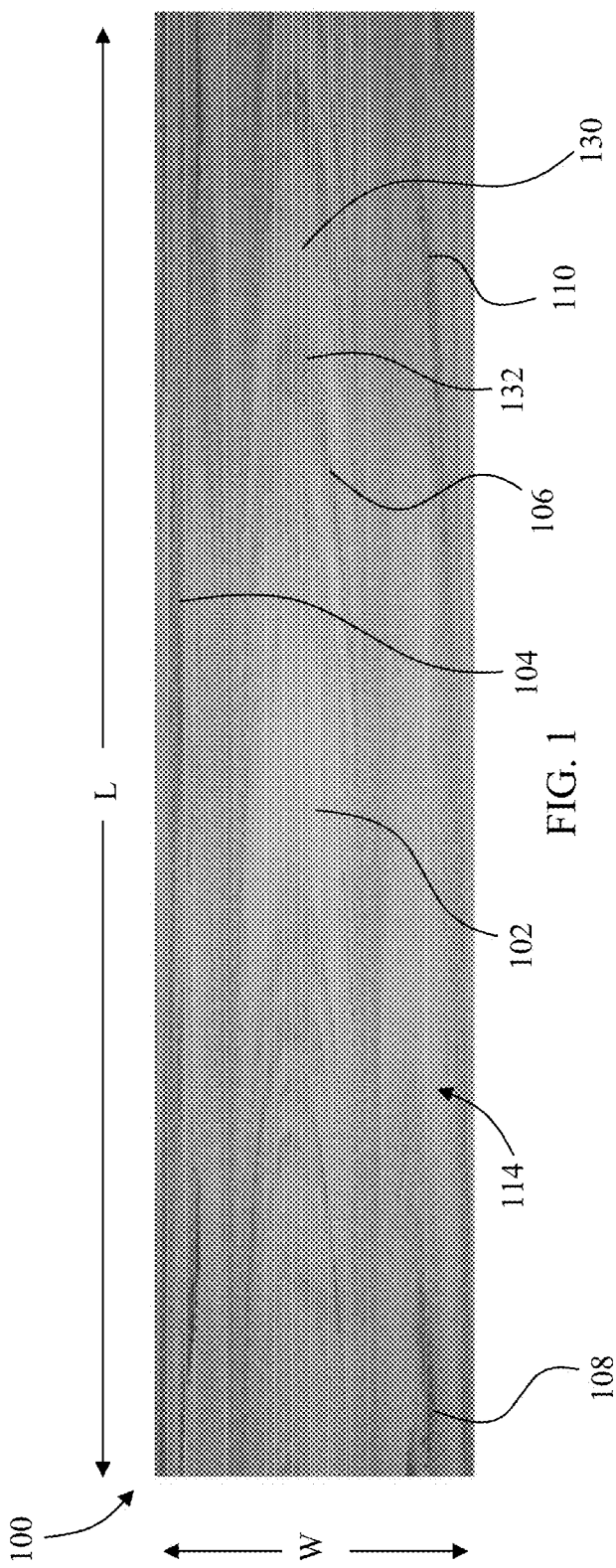
FIG. 1 depicts color photograph of a top plan view of a portion of an exposed outer surface of an extruded board in accordance with the disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art to which this disclosure pertains.

Referring now to FIG. 1, there is shown a portion of an extruded board 100. The board 100 includes a colored base resin 102 and a number of streaks including streaks 104, 106, 108, and 110. The colored base resin 102 and the streaks 104, 106, 108, and 110 are formed within the core of the board 100.

Figure 2:
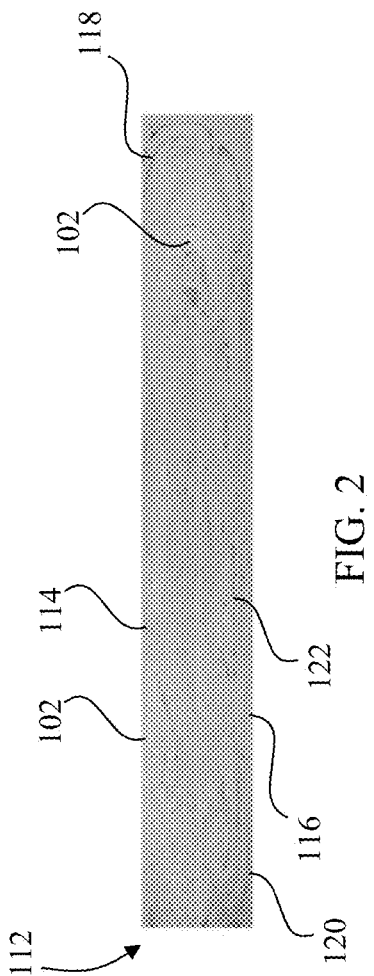
FIG. 2 depicts a color photograph of a cross-section of the extruded board of FIG. 1.

By way of explanation, FIG. 2 is an end view of the board 100 showing the core 112. In FIG. 2, portions of the colored base resin 102 are located at the exposed outer surface 114, the exposed outer surface 116, and at locations between the opposite exposed outer surfaces 114/116. Likewise, streaks such as the streak 118 extend from the exposed outer surface 114 to an inner portion of the core while a streak 120 extends from the exposed outer surface 116 to an inner portion of the core. Other streaks, such as the streak 122, are located completely within the inner portion of the core. Accordingly, while the view of FIG. 2 is an end view, a similar pattern of colored base resin 102 and streaks are exhibited at any given cross-section through the board 100.

Returning to FIG. 1, each of the streaks 104, 106, 108, and 110 is shaped differently from each of the other streaks 104, 106, 108, and 110. Thus, while the streak 108 is somewhat linear, the streak 106 is more of a chevron shape. The streaks in the board 100, including the streaks 104, 106, 108, and 110, thus present as linear streaks, cathedrals, arches, chevrons, and other shapes.

Streaks of different types have an overall width across the width "W" of the board 102 which are different from the overall width of the other streaks. For example, the streak 108 is relatively narrow and has a slight lateral drift resulting in a small overall width while the streak 106 has larger overall width. Likewise, the axial coverage of the streaks 104, 106, 108, and 110 vary along the length "L" of the board 100. For example, the terminus of the streak 106 is farther to the left than the terminus of the streak 110.

Even streaks which are somewhat similar are typically different from each other. For example, streaks 104 and 108 are both generally linear. The streak 104, however, is much narrower and longer than the streak 106. Additionally, each of the streaks 104, 106, 108, and 110 is non-uniform.

The board 100 also has a colored base resin portion 130, and a feathered portion 132. The colored base resin 130 is similar to the colored base resin 102, but is a slightly darker hue. The feathered portion 132 is a portion of a streak that blends into the colored base resin 130. Other types of patterns can also be realized, including areas having a burled appearance.

Some of the appearance of the board 100 as depicted in FIG. 1 is provided by exposed surface features of the board 100 while other features are provided by the opacity of the colored base resin 102. This is explained with reference to FIG. 3 which schematically depicts a portion of the core 112 of FIG. 2. Within the core 112, a portion of the streak 118 is depicted. The streak 118 includes an exposed surface portion 140, a first buried portion 142, and a second buried portion 144. The exposed surface portion 140 forms a portion of the exposed outer surface 114 of the board and is visible to an observer under natural light.

The buried portion 142 is spaced apart from the exposed outer surface 114 by a portion 146 of the colored base resin 102. The colored base resin 102 has an opacity which allows for the buried portion 142 to be visible to an observer under natural light. "Natural light" as that term is used herein is illumination of about 10,000 lux which is about the outdoor light level on a clear day. Beyond a certain depth, however, the opacity of the colored base resin 102 will not allow the streak 118 to be visible to an observer under natural light. Thus, the buried portion 144 is not visible to an observer under natural light.

The colored base resin 102 in one embodiment is formulated to allow the streak 118 to be visible through the colored base resin 102 at a greater depth than previously known formulations without resorting to a substantially transparent formula. By way of example, previously known blends have used a formula resulting in an opacity of about 4.67 measured on a scale of 0-5 with "0" being transparent and "5" being opaque. By modifying the formula to achieve an opacity of the colored base resin of about 2.91, visibility to a depth of about 0.02 inches under natural light is achieved. This amount of opacity provides a more realistic look.

Figure 3:
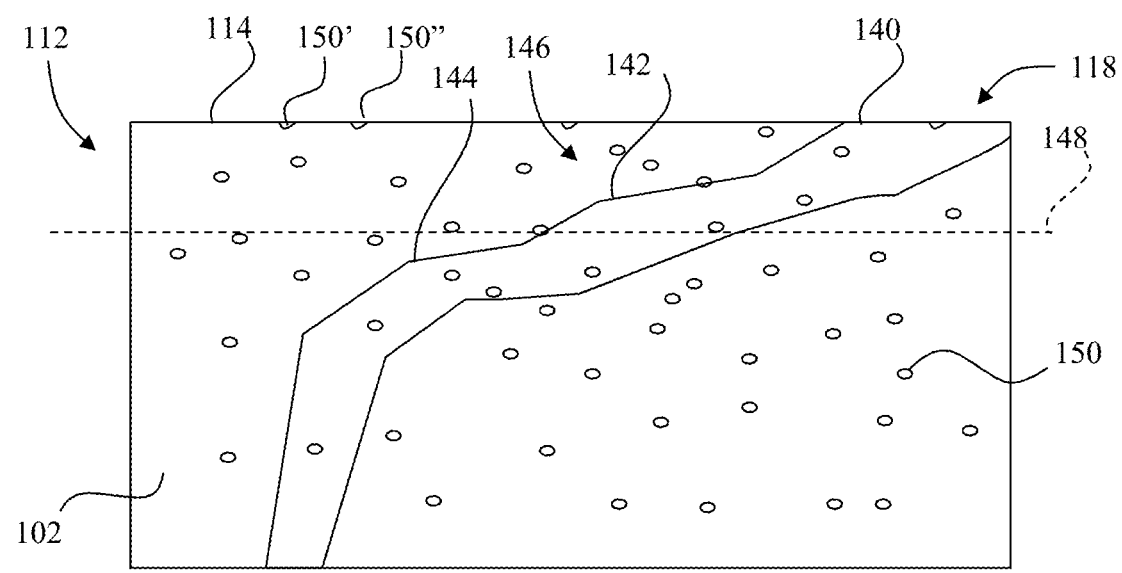
FIG. 3 depicts a schematic diagram of a portion of the cross-section of FIG. 2 including a representation of a depth of view.

The resulting opacity under natural light is indicated in FIG. 3 by a nominal depth of view line 148. Under various circumstances, however, the actual depth of view will vary from the nominal depth of view line 148. For example, a very thin layer of the streak 118 may not be visible even though the thin layer is above the nominal depth of view line 148. This provides some of the feathering effect depicted by the feathered portion 132 in FIG. 1.

Moreover, as noted above with respect to FIG. 1, the colored base resin 130 is darker than the colored base resin 102. The darker hue results in a greater opacity. Thus, areas with darker colored base resin have an actual depth of view that is less than the nominal depth of view line 148.

The end result is that the board 100 exhibits a three dimensional character which is constantly shifting over the length and width of the board. The board 100 is thus aesthetically pleasing, exhibiting a "natural" look like the look of grains in wood boards.

Returning to FIG. 3, the board 100 further includes a number of void spaces 150. The void spaces 150 are formed using a foaming agent as is generally known in the art. The void spaces 150, however, are not limited to the inner portion of the core 112 as is generally practiced. Rather, the void spaces 150 are spread throughout the core. Some of the void spaces 150, such as void spaces 150' and 150", actually open to the outer surface 114. Thus, as used herein, the term "open void space" means a void space which opens to atmosphere. These open void spaces provide texture to the outer surface 114, which in some cases is augmented by embossed grain-like patterns, which is closer to the feel of real wood than the feel provided by previously known extruded boards. Moreover, the "pores" formed by the void spaces which open to the outer surface 114 permit the board 100 to retain stains.

Figure 4:
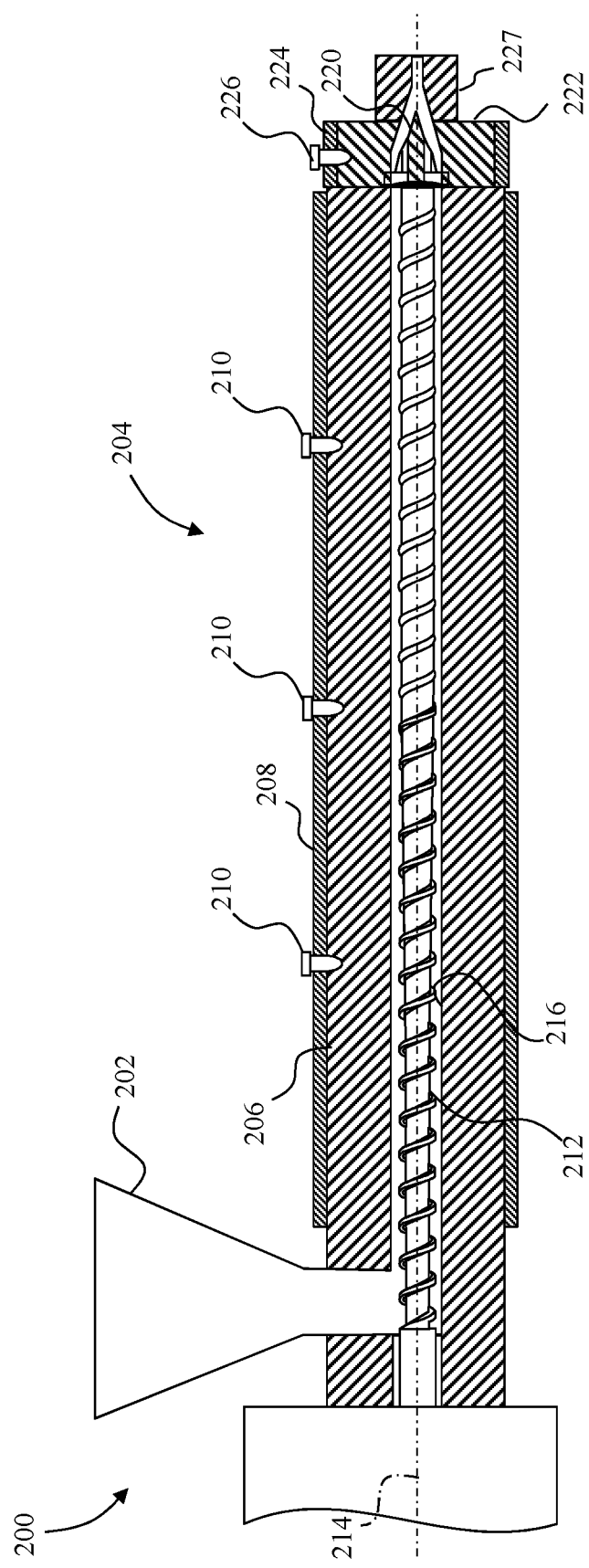
FIG. 4 depicts a simplified cross-sectional view of an extruder including a modified screw and breaker plate which can be used to extrude the extruded board of FIG. 1.

The board 100 is formed using an extrusion system 200 partially depicted in FIG. 4. The extrusion system 200 includes a hopper assembly 202 and an extruder 204. The hopper assembly 202 in one embodiment is a Maguire 220 gravimetric blender, with three additive feeders, commercially available from Maguire Products, Inc. of Aston Pa., U.S., while the extruder is a Polytruder 32:1 4.5" diameter single stage extruder with a 150 HP DC motor commercially available from Polytruder Extruder Corp. of Brampton, Ontario, Canada.

The extruder 204 includes a barrel 206. The barrel 206 is enclosed by a heater 208. A number of thermocouples 210 extend through the heater 208 into the barrel 206. The heater 208 is an electric heater with forced air (fan) cooling on 6 zones. A screw 212 extends along an extrusion axis 214 within a chamber 216 in the barrel 206. In some embodiments, a hardened liner (not shown) is provided at the outer wall of the chamber 216.

A breaker plate 220 is positioned at the distal end portion of the extruder 204 by an adapter 222. A heater 224 is located about the adapter 222 and a thermocouple 226 extends through the heater 224 into the adapter 222. A die 227 is positioned at the outlet of the adapter 222.

In operation, a blend of raw materials is provided to the extruder 204 through the hopper assembly 202. The blend includes a base resin which includes a resin such as general purpose polystyrene (GPPS) virgin and recycled, and high impact polystyrene (HIPS). Additional materials in the blend include chemical foaming agents (CFA's), color concentrates (base color and "streakers") and UV stabilizers. These materials are blended to achieve a bulk density range of 0.500-0.900 SG, and more preferably 0.600 to 0.900 SG when in lumber form. Density is varied to achieve a desired mechanical performance (i.e.: flexural strength, screw retention, brittleness etc.).

The HIPS formulation was developed with products commercially available from Total Petrochemicals & Refining USA, Inc. of Houston, Tex., U.S. The HIPS includes 85% by weight 585 PSC (polystyrene crystal) and 15% by weight 825E PSI (impact polystyrene). This formula was developed to meet performance expectation and allow for the PSC to be displaced by readily available recycle products that are available on the open market. Performance expectations include sufficient transparency to allow some depth of visibility into the material as discussed below.

The base color is selected for a desired background color of the board. In one embodiment, color concentrate is obtained from Technical Polymer Representative Inc. of Amherst Ohio, U.S. The color is selected to provide the desired opacity when mixed with the base resin to provide the colored base resin 102. Less transparent color concentrates will obscure and hide the graining effect discussed below. More transparent materials will present the graining pattern in a more 3D appearance with lighter and darker shades at different depths in the base material. A good three dimensional effect can be realized by using a base color which results in a depth of view of about 0.02 inches. The base color additive typically includes UV stabilizers, and accounts for about 3% by weight of the blend of raw materials.

The CFA is about 1.05% by weight of the blend of raw materials. The CFA is produced by Bergen International, LLC of Hasbrouck Heights, N.J., U.S. The CFA is an endothermic/exothermic blend of chemicals designed to produce maximum cell structure thru the production of gas spheres while minimizing the size of the spheres themselves. The blend for a desired application is a design choice.

The streakers are provided at about 0.04% by weight of the blend of raw materials. For applications wherein a "tighter" grain pattern is desired, a slightly larger amount of streakers may be provided. Conversely, a "looser" grain pattern can use a lesser amount. Additional variation in the grain pattern is achieved by modifications to the size and shape of the streaker pellets.

The streakers in one embodiment are obtained from Americhem of Cuyahoga Falls, Ohio, U.S. while in another embodiment they are obtained from Mosaic Color & Additives, LLC of Greenville, S.C., U.S. The particular streakers used in a given application are largely a design choice. Nonetheless, several principles are typically followed. For example, in order for the process described in further detail below to produce "grain" patterns, the streakers are selected to include a material which melts at a temperature and pressure different from the materials selected for the base resin and base color. Typically, the bulk material of the streaker bead or pellet will have a higher melting point. In some embodiments, only the outer shell of the pellet has a higher melting point.

Another consideration for the streaker material is the opacity of the streaker material. Generally the streakers will exhibit a higher opacity than the base color concentrate. Additionally, while in some embodiments a streaker of a single color is used, in other embodiments two or more streaker colors are used. Even when a single streaker color is used, the resulting grain pattern will typically exhibit multiple colors because of the interaction of the streakers with the base color and the resin as discussed in more detail below.

As the blended raw materials are fed into the chamber 216, the base resin is softened. To this end, the first zone of the barrel 206 is heated to about 305° F., which is close to the melting temperature of the base resin which melts, at the pressure in the chamber, at about 298-308° F. The base color additive also softens at this temperature and pressure. The screw within the first zone is configured to provide a thorough mixing of the softened extrudate. The screw must be configured, however, such that an exorbitant amount of streaker pellets is not melted within the first zone of the barrel 206.

One configuration of a screw which prevents exorbitant melting of the streaker pellets is shown in FIGS. 5 and 6. The screw 212 includes a power coupling portion 250 and a shaft 252. A single thread 254 extends helically about the shaft 252 from a feed section 256, through a tapered section 258, to a distal portion 260 which terminates at a conical tip portion 262. The helical thread 254 has a width of 0.63 inches and a uniform outer diameter of about 4.485 inches. The thread 254 has a 5 degree pitch and is configured such that opposing surfaces of the thread are about 4.49 inches apart along the shaft 252.

The diameter of the shaft 252, however, varies. Within the feed section 254, which is about 38 inches long, the shaft has a diameter of about 3 inches resulting in a thread height of about 0.74 inches. This provides for feeding of the components with little mixing or melting. Within the distal portion 260, which is about 64.63 inches long, the shaft 252 has a constant diameter of 4.0 inches resulting in a thread height of about 0.24 inches. The tapered portion 258 of the shaft tapers between the smaller diameter at the feed section 256 and the larger diameter of the distal section 260. Most of the mixing and melting occurs within the tapered portion 258 (also referred to as a transition zone).

The relatively high thread height within the tapered portion 258 provides thorough mixing of the melted base resin and base color additive. As noted above, however, the streakers are selected so that they do not melt given the nominal temperature and pressure established in the portion of the chamber 216 associated with the tapered portion 258. Nonetheless, high shear forces at the outer edges of the thread 254 are caused by the relatively high thread height and increasing temperatures within the tapered portion 258, resulting in some of the streaker pellets melting. The melted streakers are therefore mixed by the screw into the colored base resin, creating the deeper hues of the base resin such as the colored base resin 130 of FIG. 1. As discussed above, this will reduce the depth of view, but the reduction will be gradual due to the mixing of the streaker into the colored base resin 130. This adds to the complexity of the board without unduly increasing the opacity of the colored base resin 130.

As the extrudate approaches the transition from the tapered portion 258 to the distal portion 260, the extrudate is substantially completely mixed. Therefore, there is no need for the thread height of the tapered portion 258 to be extended into the distal portion. Moreover, in order to force the extrudate through the distal portion of the extruder 204, increased pressure is needed. Both of these goals are realized by the increasing diameter of the shaft 252 within the tapered section. Advantageously, the reduced thread height results in reduced shear forces. Accordingly, the potential for addition melting of streaker pellets is substantially reduced, even as the pressure is increased. This also allows for increased temperatures within the tapered section. Accordingly, the temperature in one embodiment is increased using a zone heating scheme with six zones from 305 degrees F. in the feed section to about 320 degrees in portions of the tapered and distal portions 258 and 260.

Figure 7:
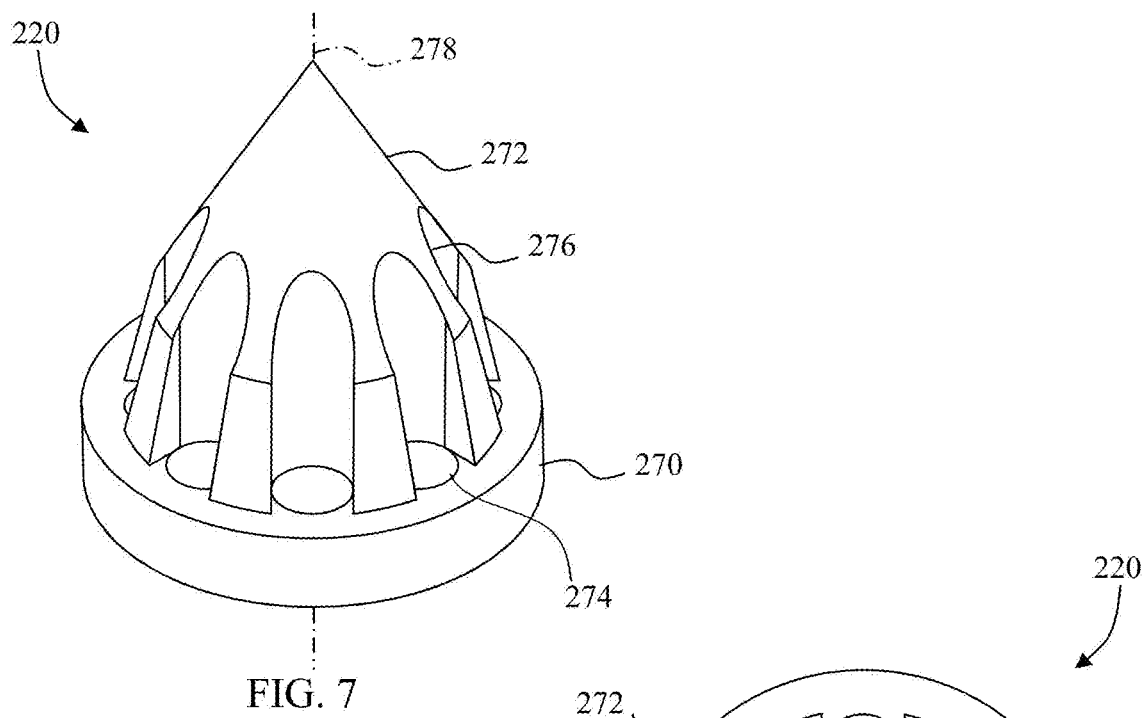
FIG. 7 depicts a perspective view of one embodiment of the breaker plate of FIG. 4.
Figure 8:
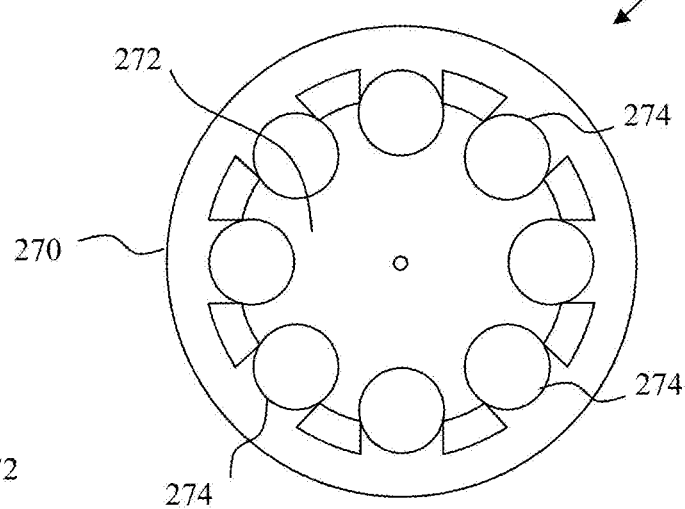
FIG. 8 depicts a back plan view of the breaker plate of FIG. 4.
Figure 9:
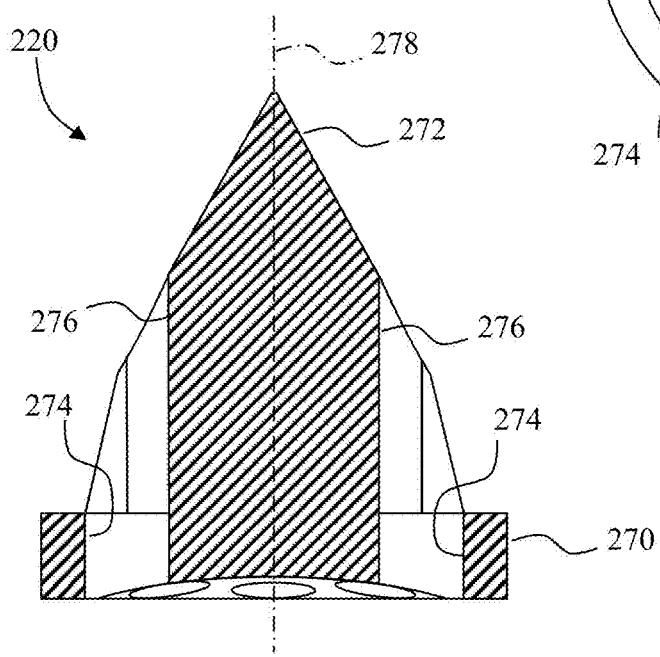
FIG. 9 depicts a cross-sectional view of the breaker plate of FIG. 4.

As the screw 212 forces the extrudate through the distal portion 260, the temperature of the extrudate is nominally maintained at about 305-315 degrees F. This is just below the melting point of the streaker pellets at the pressure within the distal portion 260. The screw 212 then forces the extrudate through the breaker plate 220, resulting in the melting of the streaker pellets as further explained with reference to FIGS. 7-9 which show additional detail of the breaker plate 220.

The breaker plate 220 includes a base portion 270, a generally conical central core portion 272, and a plurality of openings 274. Each of a plurality of grooves 276 is associated with a respective one of the openings 274, and extends from the associated opening 274 within the central core portion 272 along a longitudinal axis 278 of the breaker plate 220. A hollow 280 is defined by the base portion 270. The hollow 280 is configured to be positioned about 1 inch away from the conical tip portion 262 of the screw 212 (see FIGS. 4 and 5) such that the longitudinal axis 278 is aligned with the extrusion axis 214.

In this embodiment, the openings 274 are one inch diameter circular openings and the center of each of the circles is located 1.75 inches away from the longitudinal axis 276 of the breaker plate 220. As the extrudate is forced through the openings 274, the increased pressure and shear forces melt the remaining streaker pellets. The molten particles, however, are not mixed into the bulk of the extrudate. Rather, as the extrudate is forced off of the screw 212, the extrudate is twisting. The breaker plate 220 forces the material into a linear flow and provides steel surfaces that the molten streaker pellets touch and stick to. The flow of the extrudate thus stretches the streaker pellets predominantly axially along the extrusion axis 214 as the bulk portion of the extrudate travels across the streaker pellets which are stuck to the breaker plate causing discoloration of the base resin in a linear wood grain pattern. Some radial movement is also possible as the breaker plate linearizes the twisting bulk flow.

Figure 10:
FIG. 10 depicts a color photograph of a portion of the cross-section of FIG. 2 with adjusted contrast to show generally oval patterns formed by streaker pellets within the base resin.

As the extrudate continues along the grooves 276 and the central core 272, the extrudate in the center of the flow is slowed, resulting in a rolling of the streaked extrudate. The rolling forces portions of the streaked extrudate toward the outer surface of the bulk extrudate. The net effect of the movement of the extrudate, including the molten streaker pellets, through the breaker plate is the formation of a plurality of generally ovoid shapes such as the ovoid shape 280 of FIG. 10. FIG. 10 is a portion of the core 112 of FIG. 2. Thus, the material depicted in FIG. 10 has undergone additional process steps after passage through the breaker plate 220. Nonetheless, at least a similar patterning is believed to be present in the extrudate as it exits the breaker plate 220.

After leaving the breaker plate 220, the extrudate is passed through an extrusion die which shapes the extrudate. In one embodiment, the extrusion die is a traditional "dog bone" in shape and smaller than the finished part.

The shaped extrudate is then passed to a calibrator and thereafter cut to length. The calibrator is submerged in a vacuum bulkhead of the calibration tank, and acts as a form to which the extrudate expands as the gas pressure created by the CFA's normalizes after exiting the die. The calibrator is predrilled with small vacuum holes and the bulkhead is kept under negative pressure to assist the gas in forcing the extrudate to the inside of the form and to keep the extrudate from distorting as the extrudate cools. The entire calibrator can be submerged/spray cooled or cooled by closed loop cooling channels built into the tool. Additional racks in the following tanks hold plates with the profile shape machined thru them. The plates help to hold the shape of the part as it is further cooled. Both the calibrator and the plates are sized with the understanding that the part shrinks during cooling.

Figure 11:
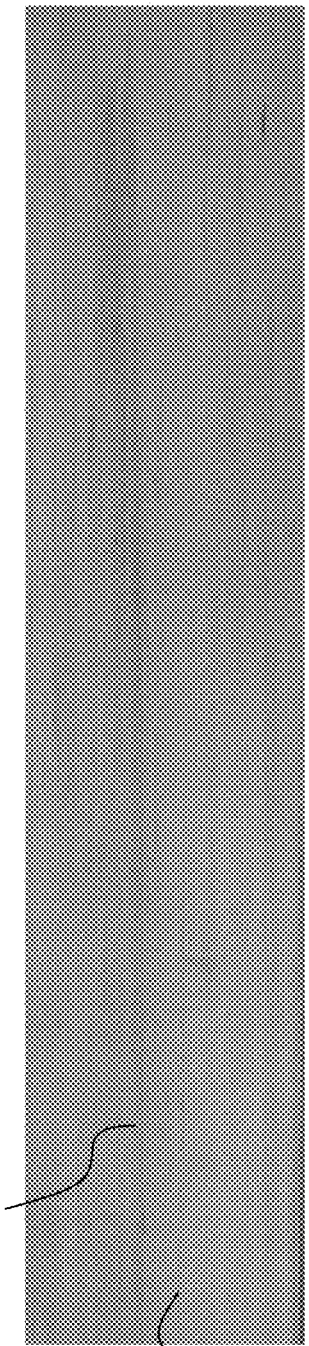
FIG. 11 depicts color photograph of an extruded outer surface of an extruded board.

After cooling, the extruded boards exhibit a graining pattern similar to the board 282 depicted in FIG. 11. Like the board 100, the extruded outer surface 284 of the board 282 includes streaks 286 which are visible down to a depth of about 0.02 inches below the extruded outer surface 284 (see, e.g., FIG. 3). While exhibiting many of the same characteristics of the extruded board 100, the streaks 286 visible at and through the extruded outer surface 284 are more predominantly linear. This is a very pleasing look, and in some embodiments the extruded outer surface 284 is the outer surface of the finally formed board.

If a more complex pattern is desired, however, an outer layer of the extruded board can be removed. Because of the manner in which the extrudate flows, and the manner in which the streaker pellets are spread in the extrudate, a more complex pattern is developed beneath the outer surface than at the outer surface of the "as extruded" board. The amount of material removed from the extruded is accounted for in establishing the "as extruded" size of the board. While any removal of material will modify the pattern, by planing or sanding about 0.020 to 0.060 inches off of the extruded board, an exposed outer surface is revealed such as the exposed outer surface 114 of FIG. 1.

As used herein, the phrase "exposed outer surface" means an outer surface of an extruded board which is exposed by removing a portion of the extruded outer surface of the board. An "extruded outer surface" is the outer surface of the resin portion of an extruded board. In both instances, as discussed below, a layer of transparent material may be formed on the exposed outer surface or extruded outer surface. Such added layers are not "exposed outer surfaces" or "extruded outer surfaces" as those terms are used herein.

Once the desired graining has been obtained, either by extrusion alone or by further removing one or more layers of material from the extruded board, additional processing of the board may be undertaken. In some embodiments, silicone wheels are heated and pressed into the surface of the profile to remove sheen, die lines and imperfections. The resulting surface texture presents as a dry matte finish. In some embodiments, the board travels through a heat tunnel which re-plasticizes the extruded outer surface or the exposed outer surface. Engraved wheels with a wood grain texture are pressed into the plasticized surface and transfer the texture into the extruded part.

Once the desired surface characteristics are effected, the board can be stained. In some embodiments, in either an unstained or stained condition, a clear sealer is applied to the extruded boards to seal them from staining and dirt and to add an additional layer of UV protection.

The disclosed extruded board allows for multiple options for finishing. The board can be brush finished, planning, sanded, and painted. The board can be cut and fastened similarly to wood. Moreover, if the board is scratched, the scratch can be removed while maintaining a natural look since the graining pattern extends into the core of the board.

Moreover, the above described process can be modified to provide different aesthetic results. By simply modifying the amount of streaker pellets, it is possible to produce variations in the appearance of the grain. Additional complexity can be achieved by the use of additional colors in both the base resin and the streaker pellets. Moreover, modification of the shape of the streaker pellets will result in a variation of the shape of the resultant grains.

Figure 12:
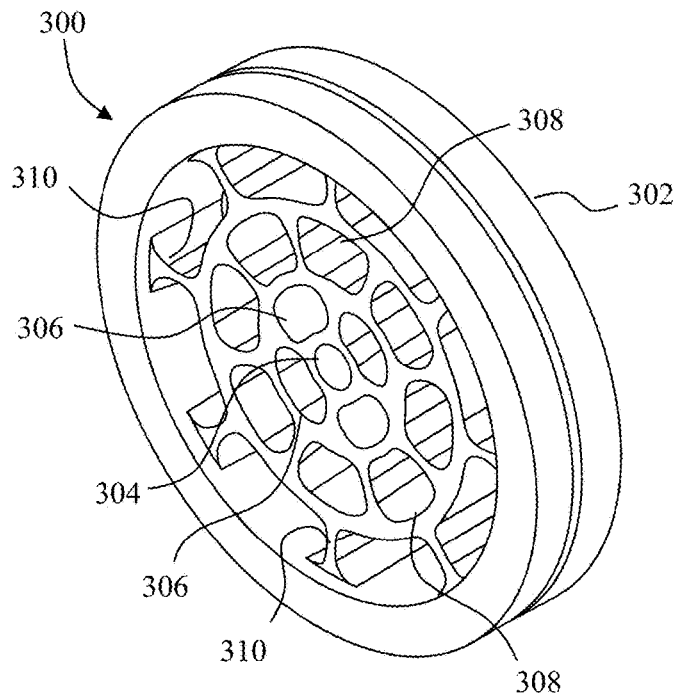
FIG. 12 depicts a perspective view of an alternative embodiment of the breaker plate of FIG. 4.
Figure 13:
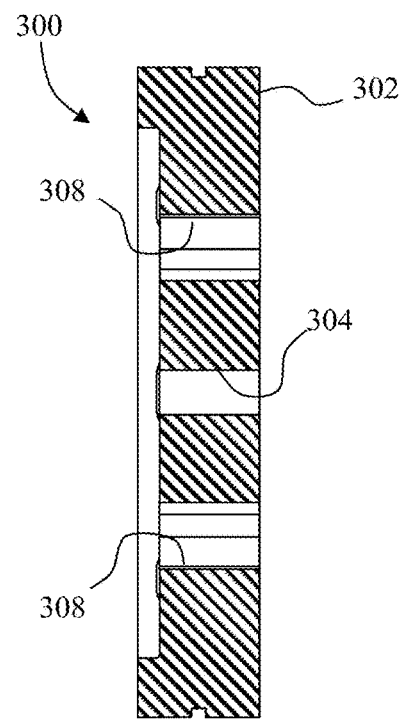
FIG. 13 depicts a cross-sectional view of the breaker plate of FIG. 12.
Figure 14:
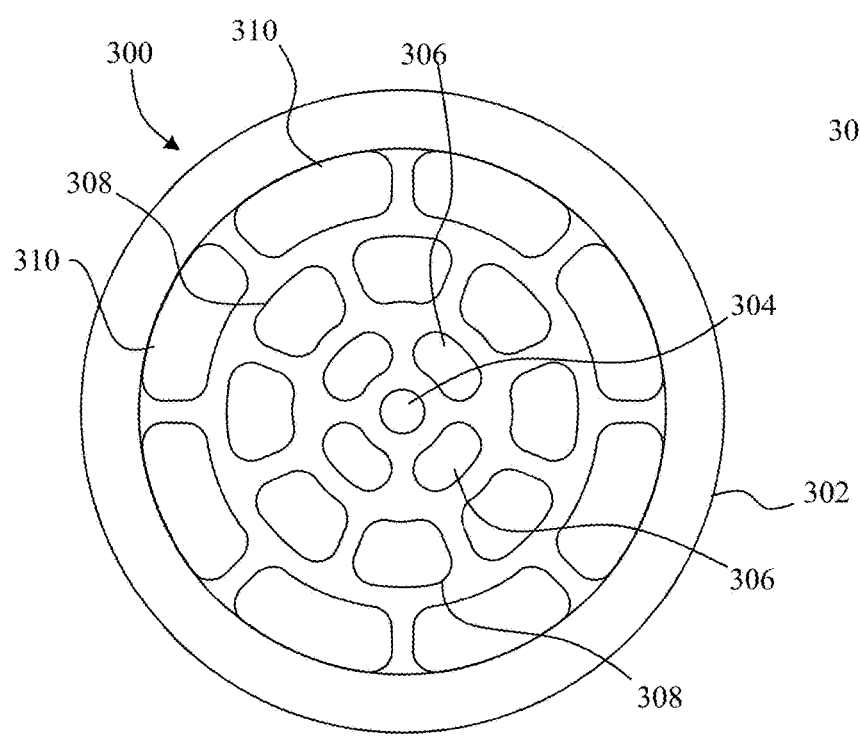
FIG. 14 depicts a front plan view of the breaker plate of FIG. 12.

It is also possible to produce variations in the appearance of the grain by altering the design of the breaker plate. By way of example, FIGS. 12-14 depict a breaker plate 300 which can be used to form extruded boards such as the board 100 using the extruder 200 of FIG. 4. The breaker plate 300 includes a base portion 302. A central circular opening 304 is defined within the base portion 302. An innermost ring of elongated openings 306 is located about the circular opening 304. An intermediate ring of elongated openings 308 is located about the elongated openings 306. An outer ring of elongated openings 310 is located about the elongated openings 308. Each of the rings of openings is concentric.

The breaker plate 300, which was used to form the board 100 of FIG. 1, functions similarly to the breaker plate 220. The provision of additional openings, however, results in generally smaller oval-like graining within the core. Additionally, the oval-like graining tends to be located deeper within the core. This is because there is no cone such as the central core 272 of the breaker plate 220 which rolls the extrudate after passing through the openings. Thus, the patterning is not rolled closer to the extruded outer surface.

Design and shape of the breaker plate thus determine the "ring" pattern of the dissimilar materials in the extrudate and the presentation of the grain on the surface of the extruded board. Grain modification can thus be realized by changing the depth of the patterns in the profile of the breaker plate, and well as by changing the shape of the central core.

Other steps in the process can be further modified to provide variations in the graining. As noted above, the amount, color, and shape of streaker pellets can be modified. Moreover, the feed rate of the pellets can be varied within a given extrusion to provide additional randomness.

The above described disclosure thus provides an apparatus for manufacturing extruded boards having color variations throughout which represent "grain" or growth rings found in natural timbers. The variations in color randomly present as cathedrals, arches, chevrons, feathering and movement. The extruded boards are formed using readily available base resins and additives.

The above described embodiments incorporate streaker pellets to provide the cathedrals, arches, chevrons, feathering and movement. This can limit the ability to form new boards using recycled boards as well as the 10-20% scrap material generated in the production of the boards. Specifically, once the boards or scrap material have been re-melted, the color which provides the cathedrals, arches, chevrons, feathering and movement is fully mixed into the bulk extrudate, thereby darkening the base color. Accordingly, in one embodiment cathedrals, arches, chevrons, feathering and movement are created using just foaming agent which avoids the costs of streaker pellets for forming streaks and allows for incorporation of recycled boards and scrap material without changing the color of the boards.

Figure 15:
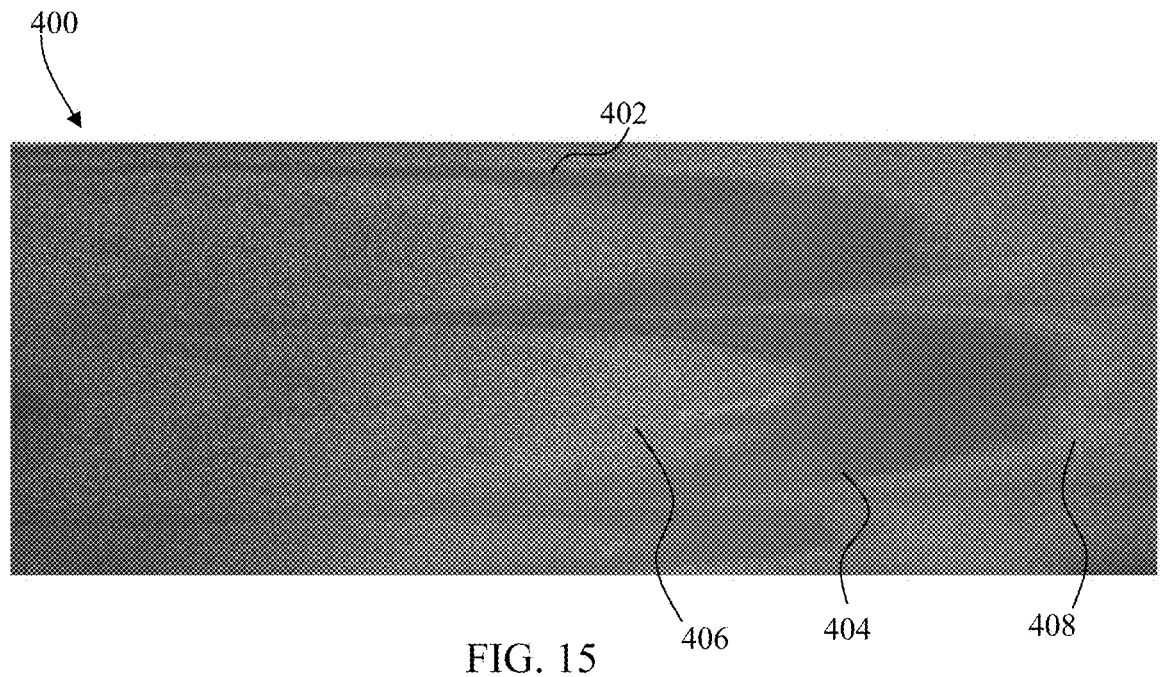
FIG. 15 depicts a color photograph of a top plan view of a portion of an exposed outer surface of an extruded board with a uniform base resin color and longitudinally extending areas of differently sized void spaces in accordance with the disclosure.
Figure 16:
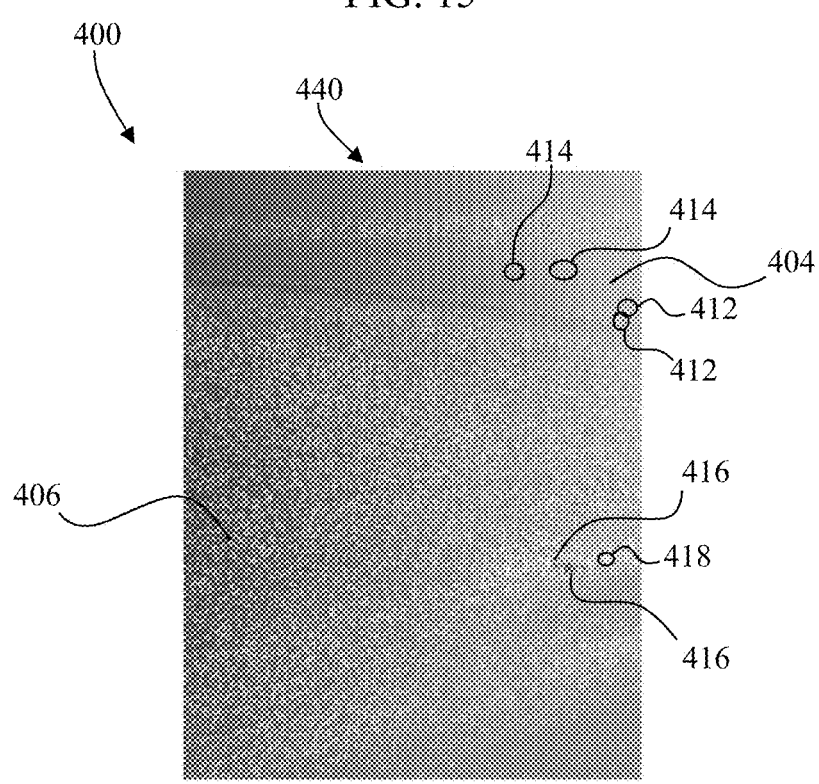
FIG. 16 depicts an enlarged portion of the photograph of FIG. 15.

FIG. 15 depicts a portion of an extruded board 400. The board 400 includes streaks 402 and 404 and lightened portions 406 and 408. In the embodiment of FIG. 15, the color of the base resin is represented by the streaks 402/404, while the lightened portions are formed by controlled differential expansion of voids formed by the foaming agent and working of the board. This is more clearly evidenced in FIG. 16 which shows an enlarged portion of the board 400 including a portion of the streak 404 and the lightened portion 406.

Within the streak 404 a number of void spaces 412 which open to the exposed outer surface of the board 400 can be seen (the open void spaces 412 are located centrally within the circled areas). A number of covered void spaces 414 are also evident. The empty volume of the covered void spaces 414 are actually located just below the exposed outer surface of the board 400. Because only a small amount of material separates the void spaces 414 from atmosphere, the exposed outer surface of the board 400 directly over the covered void spaces 414 has a lighter appearance than the actual color of the base material. Thus, the term "lightened portion" as used herein means an area which visually appears to be a color different from the base color even though the material within the "lightened portion" is the same color as the base color.

The lightened portion 406 includes a number of open void spaces 416 which open to the exposed outer surface of the board 400. The open void spaces 416 are larger, on average, than the covered void spaces 412. Likewise, a number of covered void spaces 418 are also evident. On average, the covered void spaces 418 are larger than the covered void spaces 414. Moreover, the number of covered void spaces 414 and 418 are greater than the number of open void spaces 412 and 416. Accordingly, the lightened portion 406 appears to be lighter than the streak 404 because the size of the voids, particularly the covered voids 418, are larger within the lightened portion 406 than the streaks 402/404.

As noted above, the number of covered void spaces 414 and 418 are greater than the number of open void spaces 412 and 416. This is a function of the mechanism by which the voids are formed and the manner in which the outer surfaces are exposed. The mechanism by which the voids are formed in explained with reference to the breaker plate 300 in FIGS. 12-14, which was used to form the board 400.

As discussed above, foaming agent is mixed within the bulk extrudate. Actual foaming of the extrudate, however, requires a specific combination of pressure and temperature. If the temperature is too low, foaming is inhibited. Similarly, if pressure is too high, foaming is inhibited. Consequently, to obtain the board 400, the temperature of the bulk extrudate as the bulk extrudate comes into contact with the breaker plate 300 is controlled to be at a temperature which allows for foaming. At the same time, the pressure upstream of the breaker plate 300 (i.e., the side of the breaker plate closest to the hopper assembly 202) is controlled to minimize foaming.

As the extrudate passes through the breaker plate 300, the pressure drops, allowing for foaming of the extrudate. Because the breaker plate structure is solid, the voids, typically formed by the foaming agent within the transition zone, are only allowed to expand toward the center of the openings in the breaker plate 300 thus creating differential expansion of the void spaces formed with the foaming agent. Accordingly, larger voids are formed at the interior portions of the breaker plate openings, while the voids proximate the surfaces defining the openings of the breaker plate 300 are maintained at a smaller size.

As the extrudate exits the breaker plate 300 and passes through the extrusion die, the outermost portion of the extrudate is again constrained, thus limiting expansion in the outermost portion of the extrudate. Additionally, the temperature of the extrudate is reduced as the extrudate passes through the extrusion die which in one embodiment is a traditional "dog bone" in shape and smaller than the finished part. As the temperature drops, the foaming agent is no longer capable of foaming.

Figure 17:
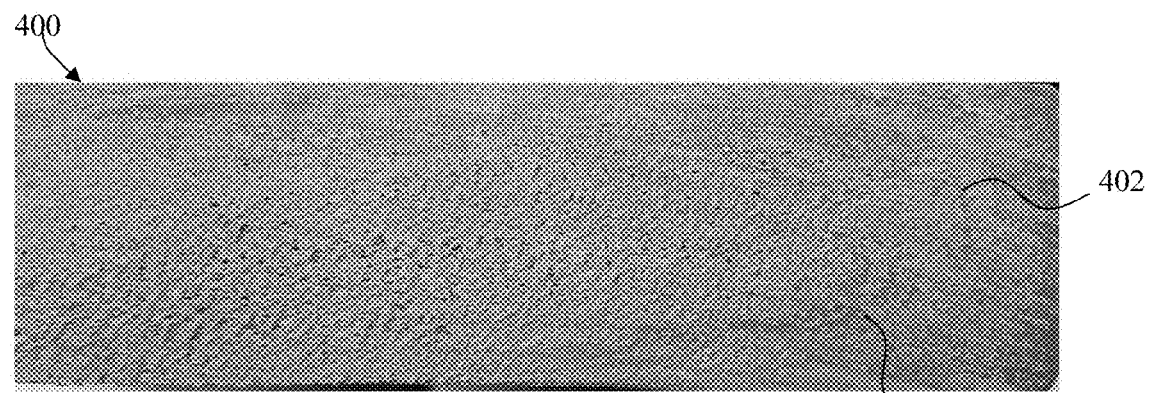
FIG. 17 depicts a color photograph of an end cut of the board of FIG. 15.

The result is that the portions of the bulk extrudate which have smaller voids are in the same location within the bulk extrudate as the streaker pellets which are melted by the breaker plate in the embodiments described above. Additionally, a "skin" of dense material is formed at the outer surface of the board. Consequently, just as the breaker plate forms streaks with the streaker pellets which are melted by the breaker plate, the breaker plate forms streaks with portions of the extrudate with smaller void spaces. This is evidenced by FIG. 17 which shows an end cut of the board 400. Within the end cut, a number of generally ovoid shapes 420 are evident. The ovoid shapes 420 are defined by areas of very small void spaces. A similarity of the pattern of ovoid shapes 420 with the pattern of the ovoid shapes 280 is evident upon a comparison of FIG. 17 with FIG. 10.

Figure 18:
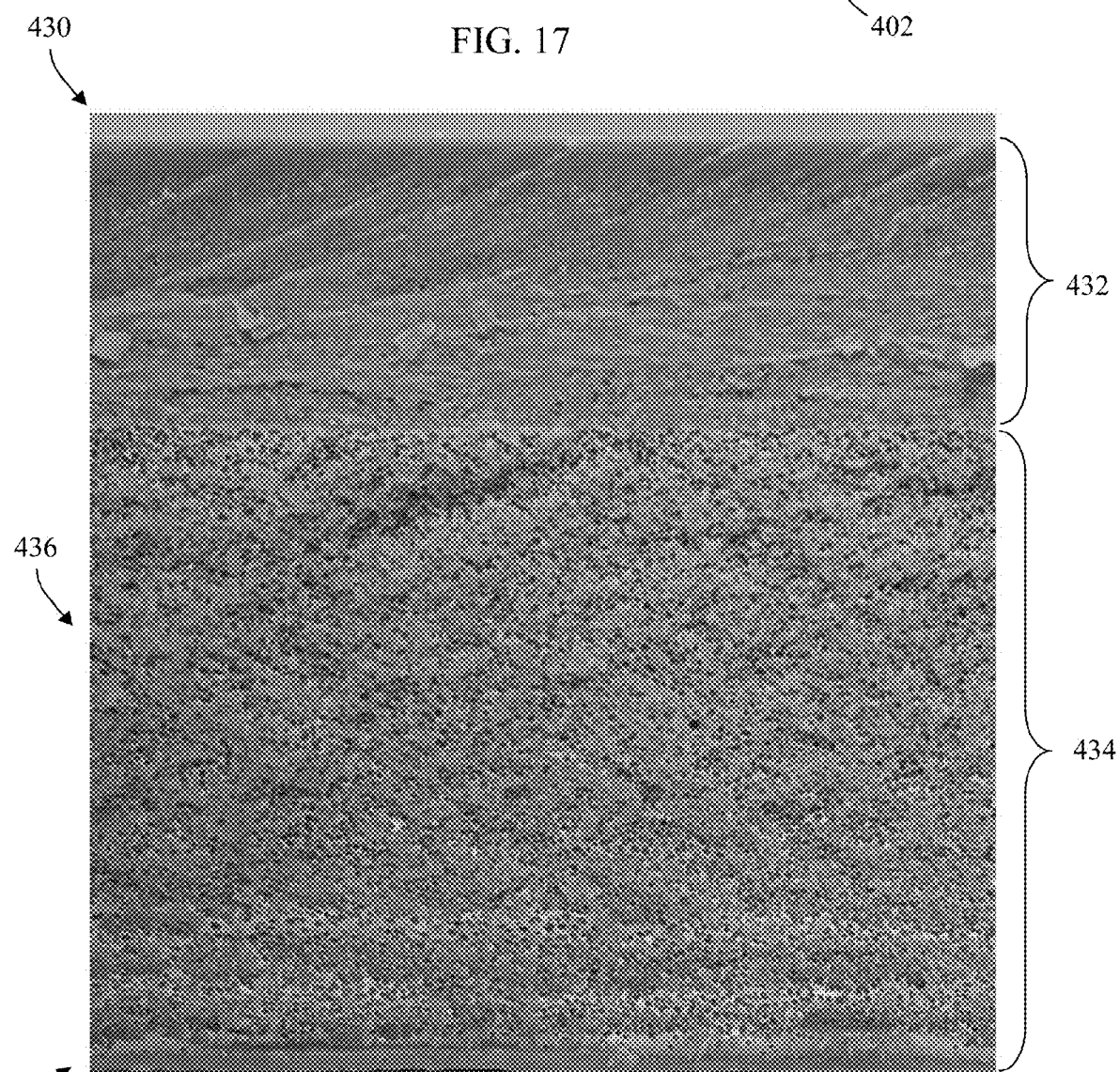
FIG. 18 depicts a color photograph of a partially cut and partially fractured end of the board of FIG. 1.

While the foregoing explains the differential sizes of void spaces, as noted above, the manner in which the outer surfaces are exposed results in a greater proportion of covered voids, producing a significant lightening in the appearance of the board in areas with larger voids. This is discussed with initial reference to FIG. 18. FIG. 18 depicts an end portion 430 of the board 100. Unlike the end portion depicted in FIG. 2 which was exposed by cutting the board, 100, the end portion 430 was exposed by partially cutting the board 100 and then breaking the board 100 along the cut.

Accordingly, the end portion 430 includes a cut portion 432 and a fractured portion 434. The fractured portion 434 reveals an interior portion 436 and a skin portion 438. The interior portion 436 within the fractured portion 434 is a heavily honeycombed structure. In contrast, the skin portion 438 exhibits a significantly lower density of open void spaces, indicating that the skin portion 438 is much more dense than the interior portion 436.

The appearance of the cut portion 432 is significantly different from the appearance of the fractured portion 434. Specifically, there are significantly fewer open void spaces within the cut portion 432 as compared to the fractured portion 434. While some reduction in the number of open voids is expected since the fracture lines in the fractured portion 434 would be expected to occur through the voids, resulting in a non-planar fracture through void spaces, this phenomena does not account for the entire reduction in the number of open voids. Rather, as explained in more detail below, the material has been burnished, resulting in the closing of some of the void spaces.

Figure 19:
FIG. 19 depicts a color photograph of the bottom of the kerf of the cut of FIG. 18.
Figure 20:
FIG. 20 depicts a color photograph of the side of the cut of FIG. 18.

The burnishing of the board 100 along the cut portion is evidenced more clearly in FIGS. 19 and 20. FIG. 19 depicts a view of the board 100 from a location generally above the exposed outer surface 114 of the board 100. From this angle, a portion of the bottom 440 of the kerf formed by cutting the board 100 is visible just above the fractured portion 434. FIG. 20 is a side view of the board 100 from the same perspective as FIG. 18, showing the cut portion 432 above the fractured portion 434. The bottom 440 is visible between the cut portion 432 and the fractured portion 434 in FIG. 20.

The bottom 440 of the kerf (see FIG. 19) exhibits a decreased number of voids proximate the outer edge of the board (the top and right side as depicted in FIG. 19) confirming the increased density of the board at the outer exposed surfaces. The bottom 440 also exhibits a significantly larger proportion of open void spaces compared to closed void spaces. FIG. 20, in contrast, exhibits a significantly larger proportion of closed void spaces compared to open void spaces in the area immediately adjacent to the bottom 440. This indicates that while a relatively clean cut was made at the bottom 440 of the kerf, burnishing was occurring at the side of the blade resulting in working of the base material of the board 100.

Figure 21:
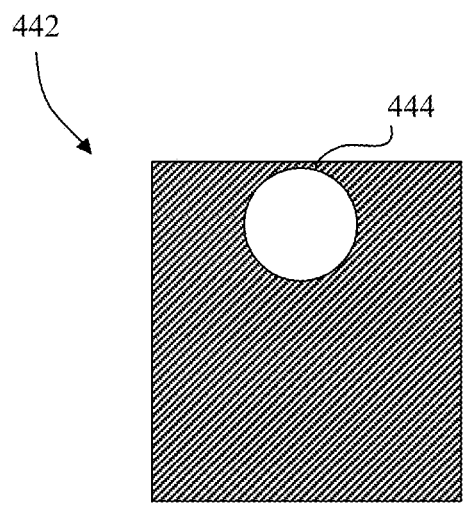
FIG. 21 depicts a cross-sectional view of an enclosed void space within a skin portion of an extruded board.
Figure 22:
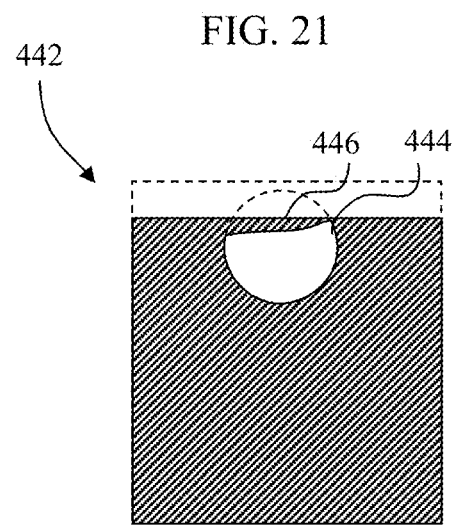
FIG. 22 depicts a cross-sectional view of the void space of FIG. 21 after a portion of the skin portion of the board has been removed and a flap formed over the void space.

The increased working of the material thus results in a closing off of some of the void spaces exposed by the working process. By way of example, FIG. 21 depicts a portion of a board 442 with a void space 444. FIG. 22 depicts the same portion of the board 442 after the board 442 has been planed or otherwise worked to remove a portion of the skin portion of the board which would expose the void space. Because localized melting of the resin occurs, some of the base resin is sufficiently softened as to be reformed as a flap 446 over the void space 444. While shown as extending completely over the void space 444, in some instances the flap 446 will only partially enclose the void space 444. In other instances, the void space will remain open.

As discussed above, the closed void spaces 414/418 produce a lighter look to the board. When streaker pellets are used in the manner described above to create streaks, the color resulting from the streaker pellets masks the lightening cause by working the void spaces. Accordingly, in a uniformly colored extrudate, the "lightening" of an area can be controlled by controlling the amount of burnishing, as well as the concentration (amount of foaming agent) and the size of void spaces (controlled pressure and temperature).

Consequently, an extruded board can be formed using a uniformly colored extrudate without the need for streaker pellets by controlling the expansion of void spaces formed by a foaming agent to occur at least partially within a breaker plate. The expansion of void spaces formed by the foaming agent within the breaker plate results in a pattern of void spaces, the pattern resulting from a differential expansion of the void spaces formed by the foaming agent within the bulk extrudate. An exposed outer surface of the board is then formed, such as by planing. For example, the board 400 was planed to form an exposed outer surface of board as evidenced by the planing lines 440 in FIG. 16. The amount of lightening, and thus the 'heaviness" of the pattern, is determined by the shape of the breaker plate (which controls the size of the void spaces and the location of the various sizes of void spaces within the extrudate) and the extent of the working of the outer surfaces of the board. In general, while a pattern may exist in the extruded outer surface, it is typically desired to remove at least a portion of the skin. By removing at least some of the outer skin of the board, larger void spaces are exposed. Increasing the amount of burnishing results, at least initially, in a "lighter" appearance of the board as open void spaces are covered.

Figure 23:
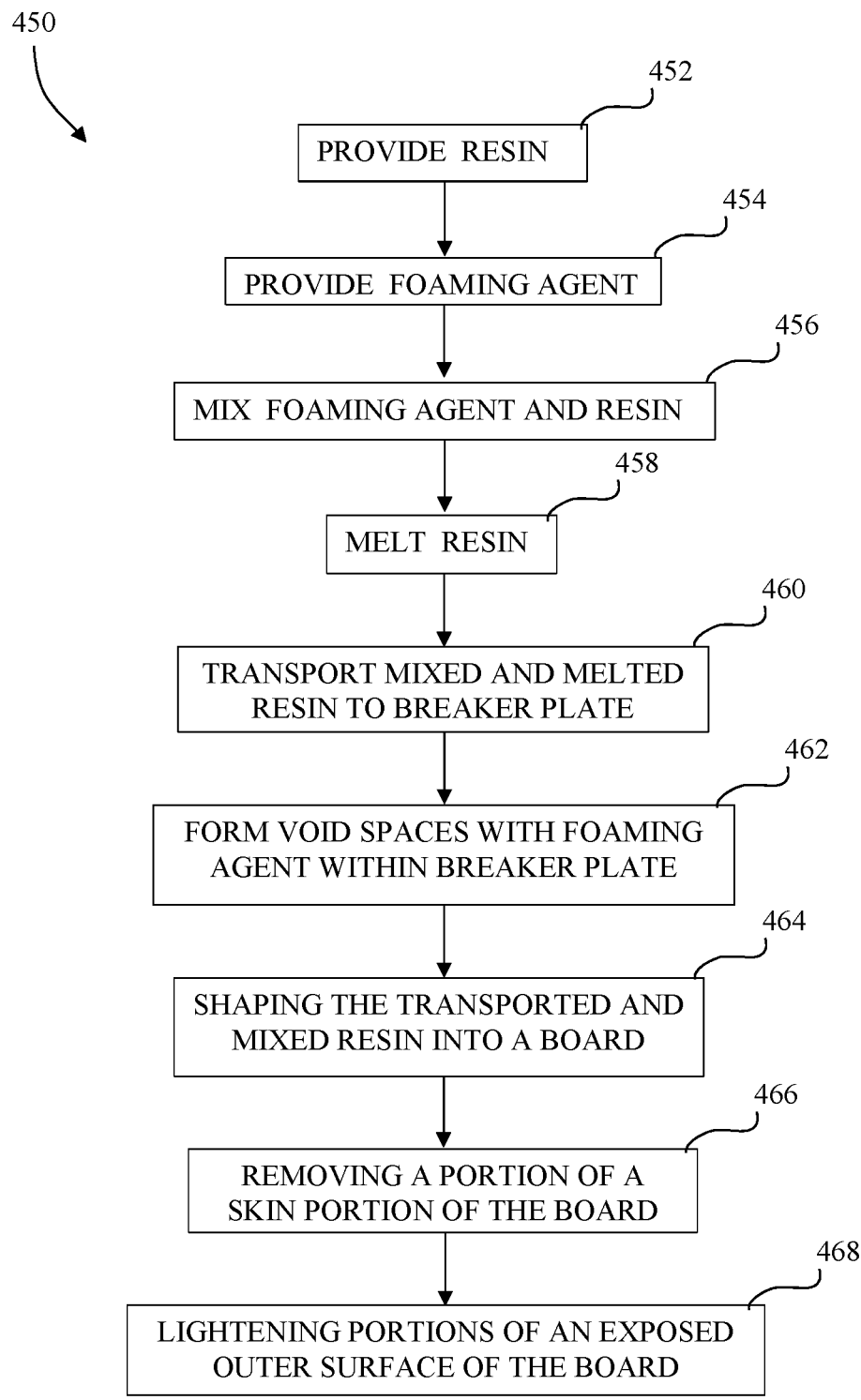
FIG. 23 depicts a process for forming an extruded board with a realistic appearance such as the board of FIG. 15 which does not require the use of streaker pellets.

FIG. 23 depicts a process 450 which can be used with the extrusion system 200 to form a board with a realistic appearance while not requiring the use of streaker pellets to form patterns. In one embodiment, the breaker plate 300 of FIG. 12 is used in the process 450. At block 452, a resin is provided. A foaming agent is also provided (block 454). The foaming agent and resin are thoroughly mixed (block 456) and the resin is melted (block 458) to form a uniformly colored extrudate. The uniform color may be obtained by the use of color concentrate. In some embodiments, the mixing occurs prior to melting. In other embodiments, the resin is melted and thereafter a foaming agent is mixed into the melted resin.

The uniformly colored extrudate is then transported to the breaker plate (block 460). The extrudate is maintained at a temperature which maintains the resin in a melted state. At the same time, the pressure and temperature is controlled such that at least some of the foaming agent does not foam. At block 462 the extrudate is passed into the breaker plate. Within the breaker plate, the pressure of the extrudate is reduced, thereby allowing at least some of the foaming agent to foam within the breaker plate to create void spaces within the extrudate. The structure of the breaker plate creates longitudinally (i.e., along the axis 214) extending areas of larger void spaces interleaved with longitudinally extending areas of smaller void spaces. Some foaming may occur after the extrudate passes through the breaker plate. Such foaming is restricted at the outermost portion of the extrudate. Thus the average size of void spaces increases from the outermost surface of the extrudate towards the core of the extrudate and a "skin" of small void spaces is formed at the outermost surface of the extrudate.

The extrudate with the interleaved longitudinally extending areas of smaller/larger void spaces is then shaped into a board (block 464) and cooled. In most embodiments, at least a portion of the skin portion is removed to form an exposed outer surface of the board (block 466). Either as a function of the removal of the portion of the skin portion and/or as a following burnishing step, portions of the exposed outer surface of the board are "lightened" (block 468) by covering void spaces which would otherwise be open to the atmosphere with a thin layer of the board material. In some embodiments, additional forming steps are performed such as end cutting the board to a desired length, embossing, applying a UV resistant coating, etc.

In some embodiments, the "resin" is virgin material, that is, resin which has not gone through the process 450. In other embodiments, at least a portion of the resin is provided in the form of waste material. "Waste material" as that term is used herein, is material which has gone through the process 450, at least through block 462, at least once. In one embodiment, the provision of a resin thus comprises obtaining waste material and melting the waste material. In some embodiments the waste material is pulverized and mixed in a non-molten form with virgin material at block 456. Significantly, the uniformly colored extrudate in a process incorporating waste material in some embodiments has the same color as the uniformly colored extrudate of the process which first forms the waste material.

Accordingly, the disclosed process allows for the use of waste material in forming an extrudate with the same color as the waste material. This is a significant advantage in that during the forming of an extruded board, as noted above, it is common for waste material to account for 10-20% the extrudate.

While a particular order has been detailed with respect to the process 450, in different embodiments some of the blocks are combined or performed in a different order, at least through block 460. Additionally, as discussed above, blocks 466 and 468 are performed simultaneously in some embodiments.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

The invention claimed is:

1. A method of forming an extruded board, comprising:
    mixing a resin and a foaming agent;
    melting the mixed resin and foaming agent to form a uniformly colored twisting extrudate with a screw portion of an extruder;
    controlling the temperature of the uniformly colored twisting extrudate at an end of the screw portion to a temperature which allows for foaming of the foaming agent;
    contacting a breaker plate with the uniformly colored twisting extrudate at the temperature which allows for foaming of the foaming agent;
    linearizing the uniformly colored twisting extrudate with the breaker plate;
    differentially expanding voids formed from the foaming agent within the uniformly colored extrudate as the uniformly colored twisting extrudate is linearized with the breaker plate;
    forming a board with the differentially expanded voids and uniformly colored extrudate; and
    forming lightened portions on an outermost surface of the formed board.

2. The method of claim 1, wherein differentially expanding the voids comprises:
    forming at least one first longitudinally extending area of first void spaces; and
    forming at least one second longitudinally extending area of second void spaces, wherein the first void spaces are on average larger than the second void spaces.

3. The method of claim 2, wherein at least a portion of the at least one first longitudinally extending area is immediately alongside at least a portion of the at least one second longitudinally extending area.

4. The method of claim 1, wherein forming the lightened portions comprises:
    removing a portion of an outer surface of the formed board;
    creating a plurality of open void spaces by removing the portion of the outer surface; and
    at least partially closing each of the plurality of open void spaces.

5. The method of claim 4, wherein forming the lightened portions comprises:
    planing the formed board.

6. The method of claim 5, wherein forming the lightened portions further comprises:
    buffing an exposed outer surface of the formed board.

7. The method of claim 4, wherein mixing a resin and a foaming agent comprises:
    providing waste material, the waste material having a first color; and
    mixing the waste material with a virgin resin portion, wherein the uniformly colored extrudate has a second color and the second color is the same color as the first color.

8. The method of claim 1, wherein mixing a resin and a foaming agent comprises:
    providing waste material, the waste material having a first color; and
    mixing the waste material with a virgin resin portion, wherein the uniformly colored extrudate has a second color and the second color is the same color as the first color.

9. The method of claim 8, wherein differentially expanding voids comprises:
    forcing the uniformly colored extrudate through a plurality of concentrically positioned orifices in the breaker plate.

10. The method of claim 9, wherein differentially expanding voids further comprises:
    forcing the uniformly colored extrudate through a plurality of concentrically positioned elongated orifices in the breaker plate.

11. The method of claim 8, further comprising;
    exposing the outermost surface of the formed board by removing an outer surface layer of between about 0.20 inches and 0.060 inches of the formed board.

12. The method of claim 11, further comprising:
    forming a clear sealer layer on the outermost surface of the formed board.

13. The method of claim 1, wherein forming the board comprises:
    moving the linearized extrudate through an extrusion die.

14. The method of claim 13 wherein the extrusion die is a die with a single dog-bone shaped opening.

* * * * *